US012688157B1

(12) United States Patent
Salpekar et al.

(10) Patent No.: US 12,688,157 B1
(45) Date of Patent: Jul. 21, 2026

(54) SYSTEM AND METHODS FOR IMPLEMENTING A CONSISTENT AND PERSISTENT HYBRID CLOUD CACHE

(71) Applicant: Egnyte, Inc., Mountain View, CA (US)

(72) Inventors: Ajay Salpekar, Hayward, CA (US); Bhaskar Guthikonda, Cupertino, CA (US)

(73) Assignee: Egnyte, Inc., Mountain View, CA (US)

( * ) Notice: Subject to any disclaimer, the term of this patent is extended or adjusted under 35 U.S.C. 154(b) by 426 days.

(21) Appl. No.: 17/217,335

(22) Filed: Mar. 30, 2021

Related U.S. Application Data

(60) Provisional application No. 63/004,896, filed on Apr. 3, 2020, provisional application No. 63/004,889, filed on Apr. 3, 2020.

(51) Int. Cl.
| | |
|---|---|
| *G06F 16/178* | (2019.01) |
| *G06F 16/16* | (2019.01) |
| *G06F 16/176* | (2019.01) |
| *G06F 16/18* | (2019.01) |
| *G06F 16/182* | (2019.01) |

(52) U.S. Cl.
CPC .......... *G06F 16/178* (2019.01); *G06F 16/164* (2019.01); *G06F 16/1774* (2019.01); *G06F 16/1824* (2019.01); *G06F 16/1865* (2019.01)

(58) Field of Classification Search
CPC .. G06F 16/178; G06F 16/164; G06F 16/1774; G06F 16/1824; G06F 16/1865
See application file for complete search history.

(56) References Cited

U.S. PATENT DOCUMENTS

| | | | | |
|---|---|---|---|---|
| 7,349,913 | B2 * | 3/2008 | Clark | G06F 16/27 707/999.102 |
| 7,809,776 | B1 * | 10/2010 | Witte | G06F 16/1734 707/825 |
| 10,929,427 | B2 * | 2/2021 | Haven | G06F 16/152 |
| 11,188,559 | B2 * | 11/2021 | Ying | G06F 16/113 |
| 11,334,540 | B2 * | 5/2022 | Yammine | G06F 16/1865 |
| 2002/0188605 | A1 * | 12/2002 | Adya | G06F 16/134 |
| 2005/0055354 | A1 * | 3/2005 | Thompson | G06F 21/604 |
| 2009/0150477 | A1 * | 6/2009 | Mcclanahan | G06F 16/172 709/203 |
| 2012/0089569 | A1 * | 4/2012 | Mason, Jr. | G06F 16/1873 707/639 |
| 2013/0226876 | A1 * | 8/2013 | Gati | G06F 16/184 707/652 |
| 2013/0232121 | A1 * | 9/2013 | Tucker | G06F 16/16 707/655 |

(Continued)

*Primary Examiner* — Ajay M Bhatia
*Assistant Examiner* — Zuheir A Mheir
(74) *Attorney, Agent, or Firm* — Pierson Ferdinand, LLC; Jeffrey R. Ambroziak

(57) ABSTRACT

Systems, apparatuses, and methods provide an architecture and associated logic to enable implementing a consistent and persistent hybrid cloud cache. The logic comprises use of the "Cloud Push" and "Metadata Reconciliation" processes combined with use of a data object described herein to enable the accurate tracking and synchronization of operations and metadata regarding operations between a local persistent cache and a cloud data store. This enables both Explicit and Implicit transactions to be monitored and reconciled to provide a complete and up to date record of all operations.

17 Claims, 5 Drawing Sheets

(56)                References Cited

U.S. PATENT DOCUMENTS

2014/0337290 A1*  11/2014  Uraltsev  ............... G06F 16/178
                                                   707/634
2015/0052105 A1*   2/2015  Nguyen  ................ G06F 16/178
                                                   707/626
2015/0142742 A1*   5/2015  Hong  .................... G06F 16/137
                                                   707/634
2015/0227550 A1*   8/2015  Matsuki  .............. H04L 67/1097
                                                   707/827
2016/0292193 A1*  10/2016  Madanapalli  ....... G06F 21/6218
2017/0091262 A1*   3/2017  Beard  ................. G06F 16/1734
2017/0220598 A1*   8/2017  Lu  ...................... H04L 67/1097
2017/0308598 A1*  10/2017  Goldberg  ................ G06F 16/23
2017/0308599 A1*  10/2017  Newhouse  ........... G06F 16/178
2019/0205407 A1*   7/2019  Ying  ....................... G06F 16/16
2019/0205556 A1*   7/2019  Kleinpeter  .......... G06F 12/1466
2020/0302075 A1*   9/2020  Rathore  ................. G06F 21/31

* cited by examiner

200

222    212    224

202    204    206

208

210    214    216    218    220

Lock the resources corresponding to in-core representation of folder F    340

Ignore MIMOs corresponding to already pushed Explicit transactions    342

Create a folder F' in purgatory with OUID    344

Move the current metadata of folder F to F'    346

Change the UID of F from OUID to NUID    348

Schedule F for Metadata Reconciliation process    350

Release all the resources (memory, locks, etc.)    352

SYSTEM AND METHODS FOR IMPLEMENTING A CONSISTENT AND PERSISTENT HYBRID CLOUD CACHE

CROSS REFERENCE TO RELATED APPLICATIONS

This application claims the benefit of U.S. Provisional Application No. 63/004,889, entitled "System And Method For Implementing A Consistent And Persistent Hybrid Cloud Cache," filed Apr. 3, 2020, the disclosure of which is incorporated, in its entirety, by this reference. This application also claims the benefit of U.S. Provisional Application No. 63/004,896, entitled "System And Method For Handling Identity Changes Of Objects In A Persistent Hybrid Cloud Cache," filed Apr. 3, 2020, the disclosure of which is incorporated, in its entirety, by this reference.

FIELD OF THE DISCLOSURE

The present application relates to cloud technologies, data storage technologies, synchronization technologies, caching technologies, journaling technologies, and more particularly, to a system, apparatuses, and methods for implementing a consistent and persistent hybrid cloud cache.

BACKGROUND

A hybrid cloud is a computing architecture that combines an on-premise data center with a public cloud environment. Hybrid cloud caches are local data storage elements used in conjunction with a public cloud-based data storage and serve as an important component of internet applications, as they help achieve improved throughput and increased data access speeds. Conventionally, such caches persist data and metadata regarding operations or transactions on a local file system. The integrity of data stored by a hybrid cloud cache may be ensured by implementing a journaling system, where a system adds records representing user operations to a journal. The journaling system may be a data storage location where records are added to represent operations performed by a user or by a computing system at the direction of a user, and the backing store for a journal may comprise disk blocks. Journals may also be referred to as logs and the two terms are often used interchangeably.

From the vantage point of a hybrid cloud cache, all operations performed through it (i.e., using the local cache as a data storage to record a transaction or operation) are referred to as Explicit Transactions (or write-through transactions), while operations that are performed directly in the cloud, i.e., around or without use of the cache, are referred as Implicit Transactions (or write-around transactions). Each node and/or object in a namespace (a term used to designate a group of names or identifiers for objects to differentiate them from other groups of object names) is assigned a unique identifier (UID), as a file-system path-independent way of referring to the object. For proper functioning of the hybrid cloud cache and the system in which it is being used, UIDs are assumed to be neither re-usable nor exchangeable. Both Explicit transactions and Implicit transactions are capable of generating UIDs for the objects in a namespace in a local cache and in a cloud data storage, respectively. As a result, there may be changes happening to a namespace cached by a local persistent cache that the persistent cache is oblivious to, such as those changes made directly to a cloud and around the persistent cache by an Implicit transaction.

In a distributed computing environment such as a hybrid cloud, the execution of Explicit and Implicit Transactions may create the potential for conflicts with each other. For example, if an object in the cached namespace accessed by the hybrid cloud cache is created by both an Explicit and Implicit Transaction, but with different types (e.g., one is a file and the other is a folder), this may cause a Type mismatch conflict. Further, since both the local cache and the cloud data storage can generate their own UIDs for objects, there are times when a hybrid cloud cache may need to reconcile two UIDs referring to the same object (i.e., an object associated with a path defining its location may be assigned two different UIDs in the namespace or have its current UID changed)—herein, this is termed a UID change conflict. In a general sense, the structure of a hybrid cloud cache may create situations in which certain information regarding stored objects needs to be synchronized or made compatible between a local persistent cache and a cloud data store to prevent errors. As an example, this may be needed to avoid a possibility of an inconsistent result between the data or metadata stored in the local persistent cache and in the cloud-based data storage.

While current technologies and methodologies for using hybrid cloud computing architectures provide benefits and efficiencies, such technologies and methodologies still have disadvantages. One of these disadvantages is evident in maintaining proper synchronization between the contents of a persistent local cache and a cloud-based data storage, particularly when a system architecture incorporates a mixture of Explicit and Implicit transactions. Embodiments of the system, apparatuses, and methods described herein are directed to processes and techniques, which together assist in presenting a consistent view of a cached namespace while preserving its integrity, and overcome possible problems caused by the aforementioned types of conflicts.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

As will be described, conventional methodologies and technologies used in managing a hybrid cloud computing architecture or other system that includes a hybrid cloud cache may be modified and/or enhanced by using an embodiment of the system, apparatuses, and methods described herein to provide a more optimized caching performance, along with enhanced data consistency and integrity. In some embodiments, this may include providing more effective handling of Explicit and Implicit transactions occurring in (through) and around a persistent local cache.

Such enhancements and improvements to methodologies and technologies may provide for improved efficiency, improved data consistency, improved data integrity, improved speed, improved redundancy, improved long-term and short-term performance, reduced costs, and increased ease-of-use.

In some embodiments, a system and accompanying apparatuses and methods for implementing a consistent and persistent hybrid cloud cache are disclosed. In particular, the system, apparatuses, and methods solve problems associated with current technologies by achieving improved data consistency and integrity via the functionality described. Notably, the system, apparatuses, and methods provide functionality to effectively handle changes happening directly in a cloud data store, which can often be orthogonal to the changes happening through a persistent cache (e.g., at a local level).

In order to reconcile such changes, in some embodiments, the system, apparatuses, and methods associate monotonously increasing numbers, known as transaction identifiers, to each element under a namespace sub-tree. The system, apparatuses, and methods utilize such transaction identifiers to monitor the temporal evolution of a namespace and to effectively reconcile changes happening directly in the cloud and around the persistent cache (termed Implicit transactions) with changes happening directly through the persistent cache (termed Explicit transactions). By doing so, the system, apparatuses, and methods are able to achieve improved data consistency and integrity between the persistent local cache and the cloud.

In some embodiments, a system, apparatuses, and accompanying methods for detecting and resolving conflicts between Explicit and Implicit transactions in a hybrid cloud cache are described and utilized. Certain of these methods or operations are termed (1) Cloud Push and (2) Metadata Reconciliation herein. In some embodiments, Explicit Transactions of a hybrid cloud cache are first executed locally in the cache and then are executed in the cloud, in a delayed fashion. The process of executing Explicit Transactions in the cloud is referred to as "Cloud Push". "Metadata Reconciliation" as used herein refers to a process, which is done at the granularity of a folder. Its goals and functionality are two-fold: (1) detecting and temporarily resolving conflicts; and (2) presenting a consistent view of a namespace to the end-user. Logic implemented as part of the Metadata Reconciliation process functions to determine the appropriate handling of conflicting metadata (such as conflicting UIDs or data type) by referring to an object (termed "MIMO" herein) that encapsulates changes made to a namespace by an Explicit transaction.

In some embodiments, the system, apparatuses, and methods may detect that a first unique identifier for a first object in the sub-tree of a namespace has been changed to a second unique identifier. Transactions associated with the object and/or identifiers may be handled by the system in a variety of different ways depending on the type and purpose of the transaction.

In some embodiments, the disclosure is directed to a system, a method, and a set of computer-executable instructions that can be used to manage a hybrid cloud cache, wherein the method includes one or more of the steps or stages of:

obtaining a first list of objects in a folder, wherein the first list is generated from a copy of the folder stored locally;

obtaining a second list of objects in the folder, wherein the second list is generated from a copy of the folder stored in a cloud storage element;

comparing the second list of objects in the folder to the first list of objects in the folder;

based on the comparison, identifying a conflict between information in the first list and information in the second list;

determining if the identified conflict is an identifier change conflict;

if the identified conflict is an identifier change conflict, then moving the objects involved in the conflict into a hidden namespace;

obtaining a data object representing operations performed on the folder as a result of execution of explicit transactions occurring locally;

executing any explicit transactions in the cloud storage that have been executed locally but not in the cloud storage;

based on the outcome of executing the explicit transactions that have been executed locally but not in the cloud storage, determining if the identifier change conflict is a direct identifier change conflict or an indirect identifier change conflict, wherein if the identifier change conflict is a direct change conflict, then changing an object's identifier in the data object to an identifier returned by execution of an explicit transaction in the cloud storage, and if the identifier change conflict is an indirect change conflict, then deleting the object and recreating the object with a different identifier;

determining if the identified conflict is a type mismatch conflict;

if the identified conflict is a type mismatch conflict, then adding a randomly generated suffix to the object's name; and using the data object representing operations performed on the folder as a result of executing explicit transactions occurring locally to override both an identifier change conflict and a type mismatch conflict, and thereby to present a consistent view of a namespace.

In some embodiments, the first list and the second comprise metadata for each of a plurality of objects in the folder, wherein the metadata comprises one or more of an identifier, name, timestamp, size, or checksum.

In some embodiments, identifying a conflict between information in the first list and information in the second list further comprises executing a metadata reconciliation process or a cloud push process, wherein the metadata reconciliation process operates to provide a temporary resolution of a conflict and the cloud push process operates to provide a final resolution of the conflict.

In some embodiments, deleting the object and recreating the object with a different identifier further comprises locking resources corresponding to an in-core representation of the folder, ignoring objects added to the data object for the folder by transactions performed in the cache that have been pushed to the cloud, creating a corresponding folder in a namespace of deleted folders of the cache with the initial identifier of the folder, moving the metadata of the folder to the corresponding folder, changing the identifier of the folder to a new identifier, scheduling the folder for a metadata reconciliation process, and releasing the locks placed on the resources.

Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

BRIEF DESCRIPTION OF THE DRAWINGS

Embodiments of the system and methods in accordance with the present disclosure will be described with reference to the drawings, in which.

Note that the same numbers are used throughout the disclosure and figures to reference like components and features.

DETAILED DESCRIPTION

Figure 1:
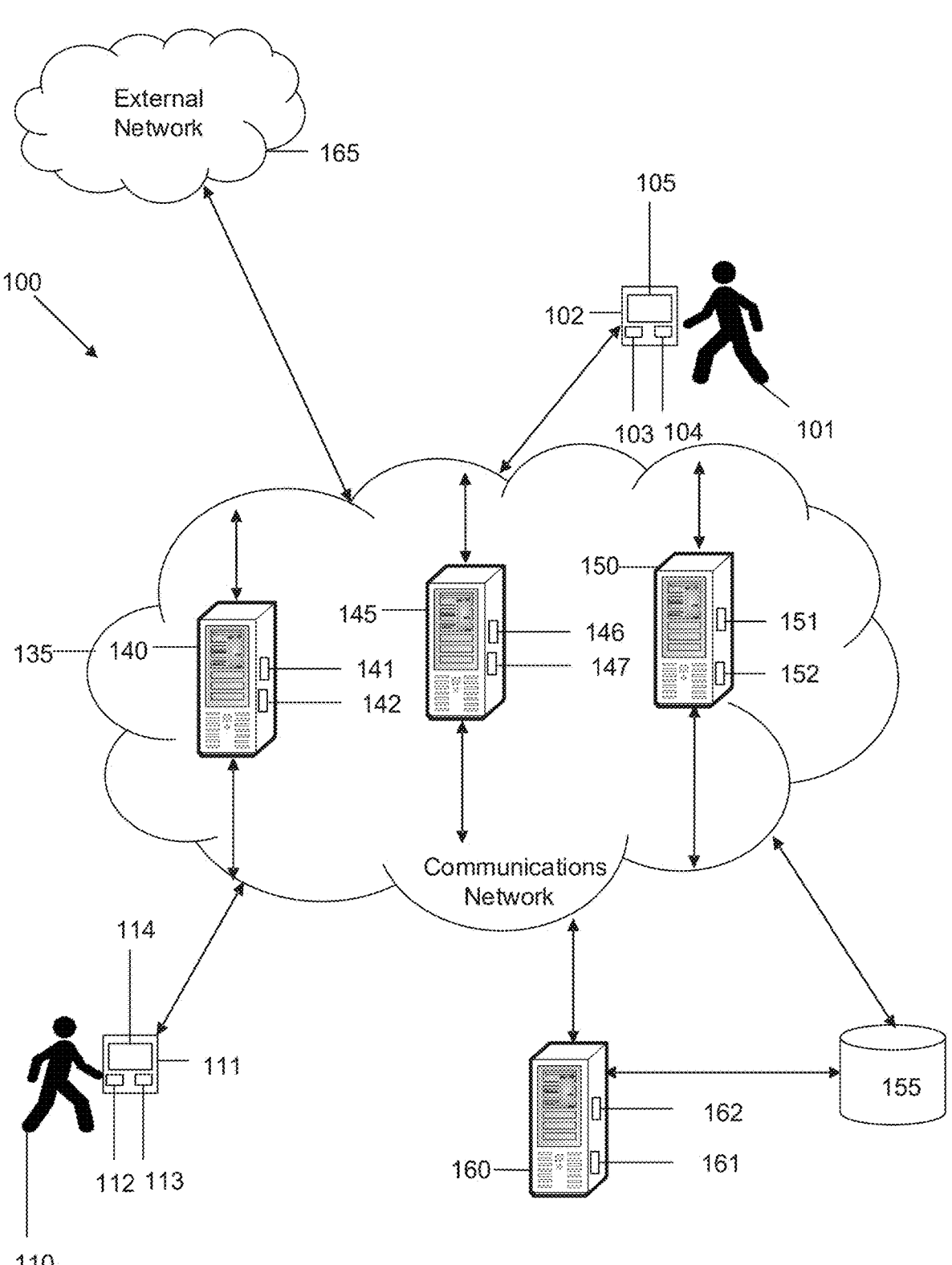
FIG. 1 is a diagram illustrating the primary elements or functions of an example system for implementing a consistent and persistent hybrid cloud cache, in accordance with some embodiments of the systems, apparatuses, and methods described herein.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform. In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

As used herein, the following terms refer to the information, data, or objects described:

Transaction Identifier (TxID) is a monotonously increasing number assigned to each Explicit Transaction and as used herein may refer to its corresponding Explicit Transaction; and Move-In, Move-out (MIMO) is an object (which may be referred to as a data object) which is used to encapsulate changes made by an Explicit Transaction to the cached namespace (i.e., to a locally stored folder or record). Examples of the changes captured by a MIMO may include, but are not limited to a new name, modified time, whether the object is moved out or into a folder; in case of a file—whether it's uploaded or updated, etc. The number of MIMOs generated by an Explicit Transaction depends on the arity of the operation it is representing, for example, a rename will generate a pair of MIMOs, as it is a binary operation (source and destination are operands).

FIG. 1 is a diagram illustrating the primary elements or functions of an example system 100 for implementing a consistent and persistent hybrid cloud cache or in which such a hybrid cache may be implemented, in accordance with an embodiment of the systems, apparatuses, and methods described herein. The system 100 may be configured to support, but is not limited to supporting, caching services, hybrid cloud services, content delivery services, monitoring services, cloud computing services, satellite services, telephone services, voice-over-internet protocol services (VoIP), software as a service (Saas) applications, platform as a service (PaaS) applications, gaming applications and services, social media applications and services, operations management applications and services, productivity applications and services, mobile applications and services, and other computing applications and services.

Notably, the system 100 may be used by a first user 101, who may utilize a first user device 102 to access data, content, and services, or to perform other tasks and functions. As an example, the first user 101 may utilize first user device 102 to transmit signals to access various online services and content, such as those available on an internet, on other devices, and/or on various computing systems. In some embodiments, the first user 101 may be an individual that seeks to conduct various operations on an application executing on the first user device 102 and/or on other devices of the system 100. For example, the first user 101 may want to store various data about the user in the system 100. In some embodiments, the first user 101 may be a robotic device, a computing device, a system, a program, a process, a humanoid, an animal, a type of user, or a combination thereof. The first user device 102 may include a non-transitory electronic memory 103 that includes computer-executable instructions stored on (or in) the memory, and an electronic processor 104 that executes the instructions to perform the various operations and functions that are performed by the first user device 102. In some embodiments, the processor 104 may be implemented as hardware, software, or as a combination thereof. The first user device 102 may include an interface 105 (e.g., a screen, monitor, graphical user interface, etc.) that may enable the first user 101 to interact with various applications executing on the first user device 102 and to interact with the system 100. In some embodiments, the first user device 102 may be and/or may include a computer, a type of sensor, a laptop, a set-top-box, a tablet device, a phablet, a server, a mobile device, a smartphone, a smart watch, or other type of computing device. Illustratively, and for purposes of an example, the first user device 102 may be considered a smartphone device in FIG. 1.

In addition to the first user 101, the system 100 may also be used by a second user 110, who may utilize a second user device 111 to perform a variety of functions. For example, the second user device 111 may be utilized by the second user 110 to transmit signals to request various types of content, services, and data provided by content and service providers associated with the communications network 135 or any other network in the system 100. In some embodiments, the second user 110 may be an individual that seeks to conduct various operations on an application executing on the second user device 111 and/or on other devices of the system 100. For example, the second user 110 may want to store various data received as inputs into an application of the system 100. In further embodiments, the second user 110 may be a robotic device, a computing device, a system, a program, a process, a humanoid, an animal, a type of user, or a combination thereof. The second user device 111 may include a non-transitory electronic memory 112 that includes computer-executable instructions stored on (or in) the memory, and an electronic processor 113 that executes the instructions to perform the various operations and functions that are performed by the second user device 111. In some embodiments, the processor 113 may be implemented as hardware, software, or a combination thereof. The second user device 111 may include an interface 114 (e.g., a screen, monitor, graphical user interface, etc.) that may enable the second user 110 to interact with various applications executing on the second user device 111 and to interact with the system 100. In some embodiments, the second user device 111 may be a computer, a laptop, a set-top-box, a tablet device, a phablet, a server, a mobile device, a smartphone, a smart watch, or other type of computing device. Illustratively, and for purposes of an example, the second user device 111 may be considered a computing device in FIG. 1.

In some embodiments, the first user device 102 and/or the second user device 111 may have a number of software applications stored thereon and/or application services stored on or otherwise accessible to them. For example, the first user device 102 and/or the second user device 111 may include or have access to cloud-based applications, database applications, caching applications, VoIP applications, other phone-based applications, product-ordering applications, business applications, e-commerce applications, media streaming applications, content-based applications, media-editing applications, gaming applications, internet-based applications, browser applications, mobile applications, service-based applications, productivity applications, video applications, music applications, social media applications, other types of applications, one or more types of application services, or a combination thereof. In some embodiments, the software applications may support the functionality provided by the system 100 and methods described in the present disclosure. In some embodiments, the software applications and services may include one or more graphical user interfaces to enable the first and second users 101, 110 to readily interact with the software applications. The software applications and services may also be utilized by the first and second users 101, 110 to interact with a device in the system 100, a network in the system 100, or a combination thereof. In some embodiments, the first user device 102, additional user devices, and/or the second user device 111 may include associated telephone numbers, device identities, or other identifiers to uniquely identify the first user device 102, the additional user devices, and/or the second user device 111.

The system 100 may also include a communications network 135. The communications network 135 may be under the control of a service provider, the first user 101, the second user 110, other designated user, a computer, another network, or a combination thereof. The communications network 135 of the system 100 may be configured to link each of the devices in the system 100 to one another. For example, the communications network 135 may be utilized by the first user device 102 to connect with other devices within or outside of communications network 135. Additionally, the communications network 135 may be configured to transmit, generate, and receive information and data traversing the system 100. In some embodiments, the communications network 135 may include one or more servers, databases, or other components. The communications network 135 may also include and/or be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, other network, or a combination thereof. Illustratively, servers 140, 145, and 150 are shown as being included within communications network 135. In some embodiments, the communications network 135 may be part of a single autonomous system that is located in a particular geographic region or it may be part of multiple autonomous systems that span more than a single geographic region.

Notably, the functionality of the system 100 may be supported and executed by using a combination of the servers 140, 145, 150, and 160. The servers 140, 145, and 150 may reside in communications network 135; however, in some embodiments, the servers 140, 145, 150 may reside outside of communications network 135. The servers 140, 145, and 150 may provide a server-as-a-service that performs the various operations and functions provided by the system 100. In some embodiments, the server 140 may include a non-transitory electronic memory 141 that includes computer-executable instructions stored on (or in) the memory, and an electronic processor 142 that executes the instructions to perform various operations and functions that are performed by the server 140. The processor 142 may be implemented in the form of hardware, software, or a combination thereof. Similarly, the server 145 may include a non-transitory electronic memory 146 that includes computer-executable instructions, and an electronic processor 147 that executes the instructions to perform the various operations and functions that are performed by the server 145. Furthermore, the server 150 may include a non-transitory electronic memory 151 that includes computer-executable instructions, and an electronic processor 152 that executes the instructions to perform the various operations and functions that are performed by the server 150. In some embodiments, the servers 140, 145, 150, and 160 may be one or more of network servers, routers, gateways, switches, media distribution hubs, signal transfer points, service control points, service switching points, firewalls, routers, edge devices, nodes, computers, mobile devices, or other suitable computing device, or a combination thereof. In some embodiments, the servers 140, 145, 150 may be communicatively linked to the communications network 135, to a network, to a device in the system 100, or to a combination thereof.

A database 155 of the system 100 may be utilized to store and relay information that traverses the system 100, cache content that traverses the system 100, store data about each of the devices in the system 100 and to perform other typical functions of a database. In some embodiments, the database 155 may be connected to (or reside within) the communications network 135, other network, or a combination thereof. In some embodiments, the database 155 may serve as a central repository for information associated with any of the devices and information associated with the system 100. Furthermore, the database 155 may include an electronic processor and memory or be connected to a processor and memory to perform the various operations associated with the database 155. In some embodiments, the database 155 may be connected to one or more of a firewall (not shown), the servers 140, 145, 150, 160, the first user device 102, the second user device 111, a device in the system 100, a process of the system 100, a program of the system 100, another device, a network, or a combination thereof.

The database 155 may store information and metadata obtained from the system 100, store data and metadata associated with operations requested in the system 100, store operations or records of operations occurring in the system 100, store information associated with journals utilized in the system 100, store metadata and other information associated with the first and second users 101, 110, store user profiles associated with the first and second users 101, 110, store device profiles associated with a device in the system 100, store communications traversing the system 100, store user preferences, store information associated with a device or signal in the system 100, store information relating to patterns of usage relating to the user devices 102 and 111 and/or other computing device, store information obtained from a network in the system 100, store device characteristics, store information relating to a device associated with the first or second user 101, 110, store information associated with the communications network 135, store information generated and/or processed by the system 100, store information for an operation and/or function of the system 100 disclosed herein, store information traversing the system 100, or a combination thereof. Furthermore, the database 155 may be configured to process queries sent to it by a device in the system 100.

The system 100 may include an external network 165. The external network 165 may be under the control of a different service provider than communications network 135, a designated user, a computer, another network, or a combination thereof. The external network 165 may be configured to communicate with communications network 135. For example, communications network 135 may be utilized to communicate with the first user device 102 and to connect with other devices within or outside external network 165. Additionally, the external network 165 may be configured to transmit, generate, and receive information and data traversing the system 100. In some embodiments, the external network 165 may include a number of servers, databases, or other components. The external network 165 may include and/or be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, or a combination thereof. In some embodiments, the external network 165 may be part of a single autonomous system that is located in a particular geographic region or it may be part of multiple autonomous systems that span more than a single geographic region.

Figure 2:
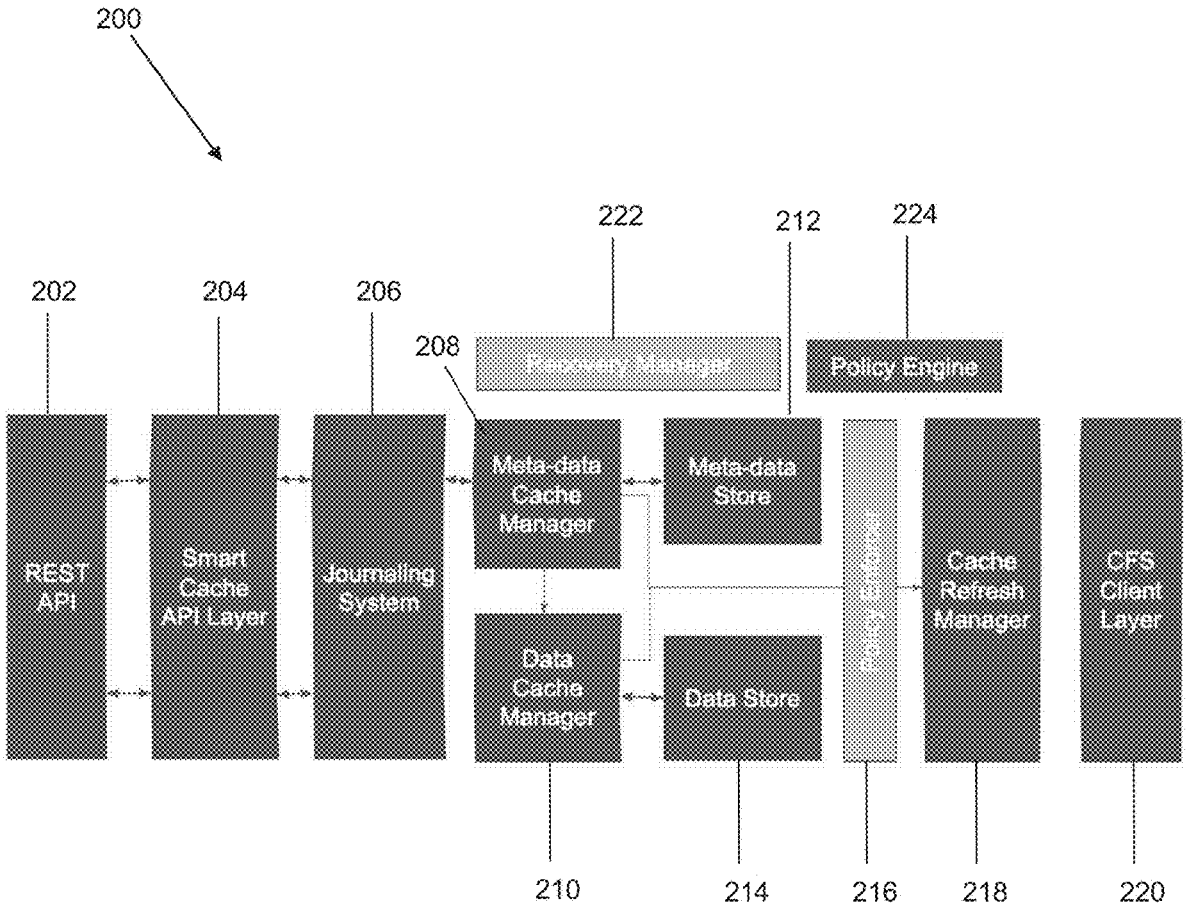
FIG. 2 is a diagram illustrating an overview of elements and functionality of a system for implementing a consistent and persistent hybrid cloud cache, in accordance with some embodiments of the systems, apparatuses, and methods described herein.

FIG. 2 is a diagram illustrating an overview of elements and functionality of a system 200 for implementing a consistent and persistent hybrid cloud cache, in accordance with some embodiments of the systems, apparatuses, and methods described herein. In certain embodiments, system 200 may be included within system 100 of FIG. 1, system 200 may be a separate system from system 100, and/or system 200 may be a subsystem of system 100 (such as being a set of elements and operations executed by a server that is part of system 100). System 200 may include, but is not limited to including, a REST Application Programming Interface (API) 202 (or other API), a smart cache API layer 204 (or other API layer), a journaling system 206 (that may include user-facing and cloud-facing journals), a metadata cache manager 208, a data cache manager 210, a metadata store 212, a data store 214, a policy enforcer 216, a cache refresh manager 218, a cloud-file-storage system (CFS) client layer 220, a recovery manager 222, and a policy engine 224. The REST API 202 may serve as an interface between the first user device 102, second user device 111, and/or other devices and applications supporting the functionality of the system 100. The REST API 202 may be configured to receive API calls from clients (e.g., to access a cache and/or to perform other functions), such as first user device 102 and/or second user device 111. The smart cache API layer 204 may serve as an intermediary between the REST API 202 and the journaling system 206, and other components of the system 100, such as, but not limited to, the cloud-file-storage system, other components, or other applications of system 100.

In some embodiments, the journaling system 206 may include a user-facing journal (termed a "ulog") and a cloud-facing journal (termed a "clog"). The user-facing journal may be configured to record operations, such as transactions (including data and metadata associated with the operations). The metadata may be information that describes the data and/or operations, the contents of the data, the type of operation, etc. In some embodiments, the user-facing journal may be a circular log, buffer, or other data structure. The cloud-facing journal may be configured to be larger than the user-facing journal and may be configured to relieve the load on the user-facing journal. The cloud-facing journal may also be a circular log, buffer, or other data structure. In some embodiments, the user-facing journal may transfer records storing information associated with the operations to the cloud-facing journal. Once the records are transferred to the cloud-facing journal, the records may be deleted or over-written on the user-facing journal. The journals may be utilized to ensure that the operations requested by clients are ultimately carried out and performed-even if system 100 and/or system 200 experiences a problem. Data and meta-data associated with the operations may be managed by the data cache manager 210 and the metadata cache manager 208, respectively. In some embodiments, the records including the data and metadata may be stored in the data store 214 and the metadata store 212 respectively. Further details regarding the operation and management of the user facing and cloud facing journals may be found in U.S. patent application Ser. No. 17/167,824, entitled "System And Methods For Effectively Addressing Fast-Producer And Slow-Consumer Problem For Persistent Hybrid Cloud Caches", filed Feb. 4, 2021, and assigned to the assignee of the present application, and the entire contents of which is hereby incorporated by reference.

System 200 may include a policy enforcer 216, which may be configured to enforce the policies and rules associated with system 200 and/or system 100. The cache refresh manager 218 may be configured to refresh a cache in the system 100 and/or system 200. For example, the cache refresh manager 218 may be configured to ensure that data and/or metadata recently stored in a particular cache is current and/or accurate. System 200 may also include a cloud-file-storage system (CFS) client layer 220, which may be utilized to facilitate providing records associated with the operations from a cloud-facing journal (the clog) to a cloud-file-storage system. Additionally, system 200 may include a recovery manager 222, which may be configured to recover lost data and/or metadata and ensure that the integrity of the data in the journals and/or caches of system 100 and/or system 200 is preserved. System 200 may further include a policy engine 224, which may be configured to generate and/or conduct various operations associated with policies and/or rules utilized with system 100 and/or system 200.

With regards to policy engine 224, examples of policies that may be implemented by the engine include but are not limited to, or required to include the following:

a) Storage Management policies (e.g., how much disk space should be used by the cache);

b) Caching policies—what should be cached, what part of cache should be updated and when; and c) Eviction policies—What should be evicted/removed from cache if there is a need to do so.

In some embodiments, one or more policies may be implemented in whole or in part by a rule-base, a trained machine learning model, or other decision process.

Figure 3A:
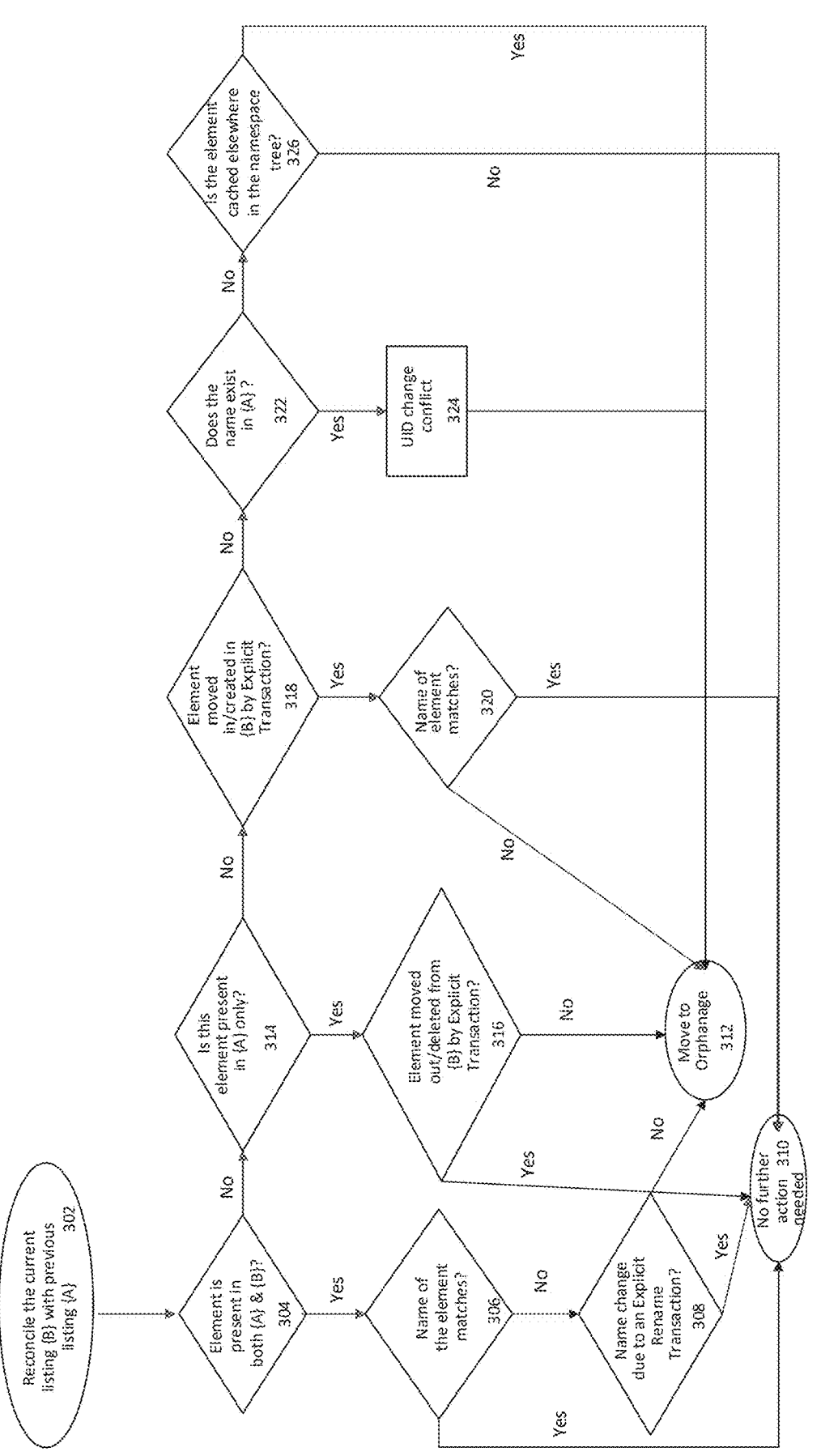
FIG. 3A is a diagram illustrating further details of the process, method, function or operation for implementing a consistent and persistent hybrid cloud cache, in accordance with some embodiments of the systems, apparatuses, and methods described herein.
Figure 3B:
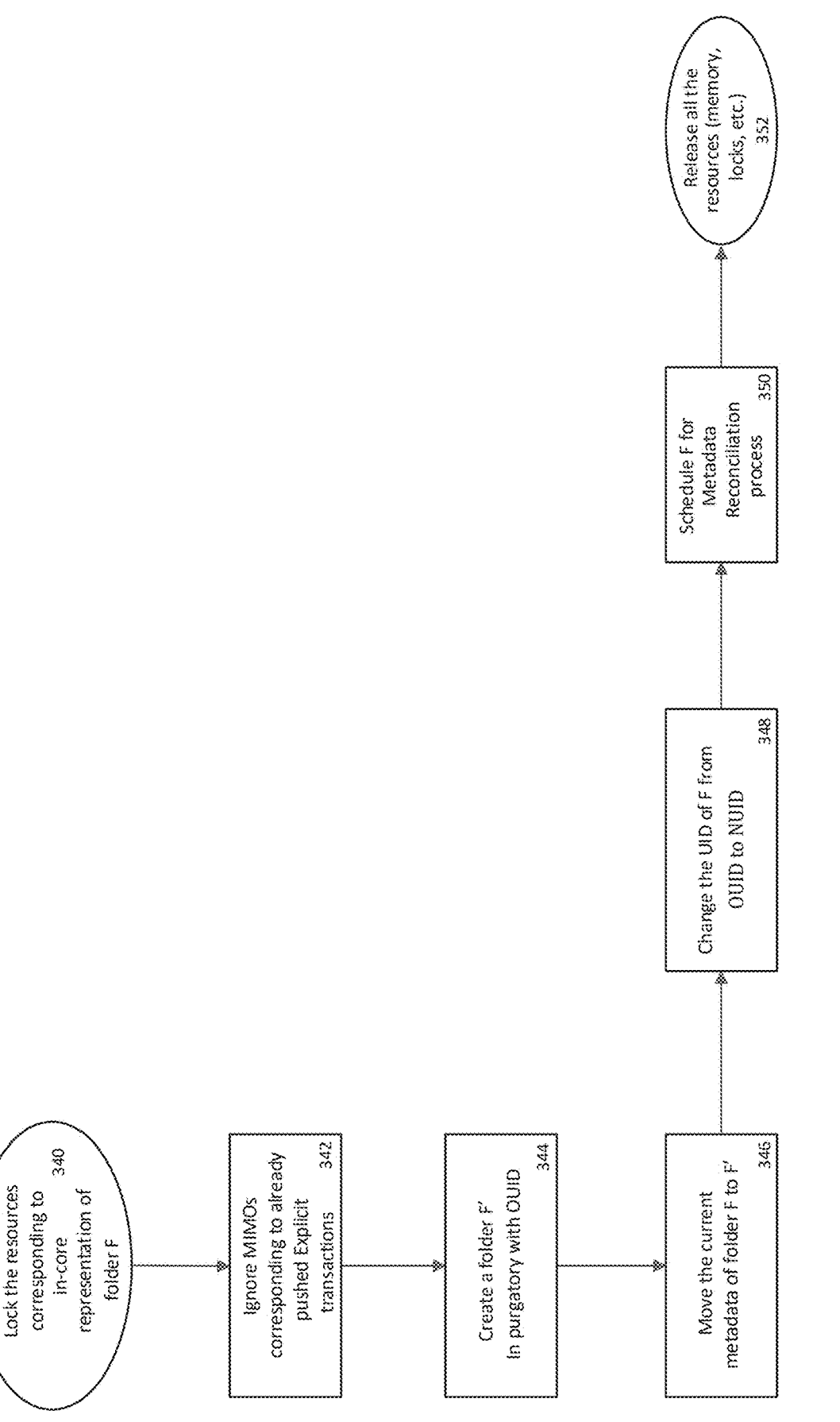
FIG. 3B is a diagram illustrating further details of the "reincarnation" process, method, function or operation for implementing a consistent and persistent hybrid cloud cache, in accordance with some embodiments of the systems, apparatuses, and methods described herein.

In some embodiments, system 100 and/or system 200 may operate to perform the functionality and capabilities described in the present disclosure in accordance with the data processing flows shown in FIGS. 3A and 3B. As described with reference to FIG. 1, system 100 may perform the operative functions disclosed herein by utilizing the processing capabilities of server 160, the storage capacity of the database 155, or other component of system 100 to perform the functions disclosed herein. Server 160 may include one or more processors 162 that may be configured to execute a set of software instructions to implement one or more of the functions of system 100. Processors 162 may take the form of software, hardware, or a combination of hardware and software. Additionally, server 160 may include a non-transitory memory 161, which stores instructions that processors 162 execute to perform various operations of system 100 or system 200.

For example, server 160 may participate in the various tasks performed by the various devices in system 100, such as, but not limited to, refreshing nodes in a namespace tree as part of a process to handle and reconcile Explicit transactions occurring through a persistent local cache and Implicit transactions occurring in a cloud and around (outside of or bypassing) the persistent cache; detecting UID changes of objects rooted under a refreshed or refreshing node; conducting processes to handle various types of transactions; and performing other operations conducted in system 100.

In one embodiment, multiple servers 160 may be utilized to implement the functionality of system 100. Server 160 and other devices in system 100, may utilize the database 155 for storing data about the devices in system 100 or other information that is associated with system 100. In one embodiment, multiple databases 155 may be utilized to store data in system 100. In some embodiments, server 160 may include one or more program modules, each of which may include software instructions that when executed by a programmed processor cause the server to conduct the various operations performed by server 160.

Although FIGS. 1-4 illustrate specific example configurations of the components of system 100, the system may include other configurations of the components, which may include using a greater or lesser number of the components. For example, system 100 is illustratively shown as including a first user device 102, a second user device 111, a communications network 135, a server 140, a server 145, a server 150, a server 160, and a database 155. However, system 100 may include multiple first user devices 102, multiple second user devices 111, multiple communications networks 135, multiple servers 140, multiple servers 145, multiple servers 150, multiple servers 160, multiple databases 155, or a number of other components. Additionally, system 100 may comprise the components or processes illustrated in FIGS. 2, 3A, 3B, and 4. Furthermore, in some embodiments, portions of the functionality and operations of system 100 may be performed by other networks and systems that may be connected to system 100.

As will be described with reference to the flowcharts or flow diagrams of FIGS. 3A and 3B, embodiments of the system, apparatuses, and methods described herein provide an architecture and associated logic to enable implementing a consistent and persistent hybrid cloud cache. The logic comprises use of the "Cloud Push" and "Metadata Reconciliation" processes combined with use of the MIMO data object described herein to enable the accurate tracking and synchronization of operations and metadata regarding operations between a local persistent cache and a cloud data store. This enables both Explicit and Implicit transactions to be monitored and reconciled to provide a complete and up to date record of all operations.

In some embodiments, to accomplish these goals, a folder is periodically refreshed. The refreshing operation causes a fetch of a current list of files/sub-folders under or within the folder. Each element in the list is associated with or describes data, objects, or information under/within the folder, and that are stored in the cloud. This data or information typically includes: UID, name, timestamp, size, checksum, and other relevant attributes. Thus, in some sense, the current contents of a list for a folder represents the current state of all Implicit transactions performed on the contents of the folder and of all Explicit transactions involving the folder contents that have been pushed to the cloud at the time the folder is refreshed. In some embodiments, the data and/or information from the list, complemented by the list of MIMOs—referred to herein as the set {M}, and which is a data object accumulated on folders through Explicit Transactions, may be used to generate and present a consistent view of the namespace to the end-users. This is accomplished by a specific set of logical operations developed by the inventors that function to evaluate the list and use that evaluation with the contents of {M} to determine the appropriate action.

Thus, in some embodiments, the combination of the refreshed list and the list of MIMOs provides enough information to permit a reconciliation between the contents of each folder in the local cache and the corresponding folder in the cloud data storage. In some embodiments, this reconciliation may comprise identifying and resolving potential conflicts between the contents of a locally stored folder and its corresponding cloud folder, and/or updating information regarding an Explicit transaction that was executed locally but not yet pushed to the cloud. Note that if an object is present in both the list of MIMOs and the cloud list, then the object in the MIMO overrides (masks) the cloud object for purposes of the logic or processing described (such as updating or revising information).

As an example of the logic implemented by an embodiment using the cloud list and the set {M} to provide a consistent and persistent hybrid cloud cache, consider the following scenario (as shown in FIG. 3A, which is a flowchart or flow diagram illustrating further details of the process, method, function or operation for implementing a consistent and persistent hybrid cloud cache, in accordance with some embodiments of the systems, apparatuses, and methods described herein):

At time $T_1$, in the hybrid cloud cache—the system has an initial list {A} corresponding to a folder F. Note that in an example implementation, obtaining the list may involve a set of sub-processes; for example, the cache may request information from cloud storage about folder F at time X1, the cloud storage receives the request at time X2, the cloud storage constructs set {A} at time X3, and the cache receives set {A} at time X4, where, X1<X2<X3<X4, and $T_1$ is a time equal to or later than X4. Assume this is the first fetch of folder F by the hybrid cloud cache and that there are no Explicit Transactions (or none that have not already been accounted for and reconciled by being pushed to the cloud using the Cloud Push process) on this folder. A list has an Explicit TxID associated with it, which is the same as the Explicit TxID of the system at that time. The TxID is used as a temporal reference point to mark the state of the namespace under the folder being refreshed. Call this data PtxID at $T_1$. At time $T_2$, the system refreshes the folder, which generates a new list {B}. Call the Explicit TxID of this iteration RtxID. Then, to cause the more recent list of folder F, {B}, to function as the current list (that is to detect possible conflicts as part of a process to reconcile the lists and resolve conflicts), the system, apparatuses, and methods compare the contents of {B} with the previous list, {A} and execute the following steps, stages, or logic (as suggested by step or stage 302). In some embodiments, the system and processes perform a reconciliation to detect the conflicts, and temporarily move the elements to the Orphanage, and make the most recent list {B} the current list for folder F. Note that in the local cache, the list files are immutable. Any add/delete/ update to elements in a list get reflected in a subsequent list (post-Cloud Push) by the Cloud Push process pushing Explicit Transactions into the cloud storage:

I. For the elements (where an element in this context may refer to a file system object, such as a file or folder) present[1] in both of list {A} and list {B} (corresponding to the "Yes" branch of step or stage 304)—one of the following actions is performed:

[1] The presence of an element in the list is established by querying for its UID.

a. If the element name matches (corresponding to the "Yes" branch of step or stage 306)—then this element in {B} was already part of the previous list {A}, and no further action is needed (as indicated by the "No further action needed" state 310);

b. If the name does not match (corresponding to the "No" branch of step or stage 306)—then the logic checks if there is an element from {M} (which as noted is a record of Explicit transactions) whose TxID<=RtxID; if yes, this element is generated by an Explicit Rename Transaction and has been processed by the Cloud Push process or operation. In this situation, no further action is needed (corresponding to the "Yes" branch of step or stage 308, and as indicated by the "No further action needed" state 310);

c. Otherwise, there is a potential conflict—if so, then temporarily resolve it by moving the element to a hidden namespace, termed the "Orphanage" herein (corresponding to the "No" branch of step or stage 308 and as indicated by the "Move to Orphanage" operation 312);

II. For an element present only in {A} (corresponding to the "No" branch of step or stage 304, and the "Yes" branch of step or stage 314)—one of the following actions is performed:

a. If there is an element from {M}, whose TxID<=RtxID, then this element is absent in {B} because of an Explicit Rename/Delete Transaction. In this situation, no further action is needed (corresponding to the "Yes" branch of step or stage 316, and as indicated by the "No further action needed" state 310);

b. Otherwise, this indicates that this element is deleted/ moved-out by an Implicit Transaction in the cloud. If so, then temporarily resolve this by moving the element to the Orphanage (corresponding to the "No" branch of step or stage 316 and as indicated by the "Move to Orphanage" operation 312);

III. For the elements present only in {B} (corresponding to the "No" branch of step or stage 314)—one of the following actions is performed:

a. If there is an element from {M}, whose TxID<=RtxID, then this element is present in {B} because of an Explicit Move-in/Create Transaction (corresponding to the "Yes" branch of step or stage 318);

i. If the names match, then no further action is needed (corresponding to the "Yes" branch of step or stage 320, and as indicated by the "No further action needed" state 310);

ii. If the names do not match, then there is a potential conflict. If so, the system temporarily resolves it by moving the object to the Orphanage (corresponding to the "No" branch of step or stage 320 and as indicated by the "Move to Orphanage" operation 312).

IV. If there is no element in {M} for which TxID<=RtxID (corresponding to the "No" branch of step or stage 318), then the logic checks for whether the name exists in list {A} (corresponding to decision process 322);

a. If the name of the element exists in {A} (corresponding to the "Yes" branch of step or stage 322), then the system treats this as a UID change conflict (as indicated by element or process 324). In response, the system moves the element to the Orphanage (as indicated by the Move to Orphanage 312 logic flow or process);

b. If the element name does not exist in {A} (corresponding to the "No" branch of decision process 322), then it is determined whether the element is cached elsewhere in the namespace tree (corresponding to decision process 326);

i. If the element is not cached at a different location in the namespace (corresponding to the "No" branch of 326), then no further action is needed (as indicated by the "No further action needed" state 310);

ii. If the element is cached at a different location in the namespace (corresponding to the "Yes" branch of 326), then the element is moved to the Orphanage (as indicated by the "Move to Orphanage" operation 312).

In some embodiments, the above processing flow repeats periodically for folder F (and for other folders and their respective objects and elements), and the current Explicit TxID in the system becomes the RtxID of this iteration.

As recognized by the inventors, there are two types of conflicts which can occur as a result of the execution of Explicit and Implicit transactions and that may be identified and resolved by the architecture and logical processes described. Note that as a result of the preceding logic described with reference to FIG. 3A (that is, up to decision processes 322 and 326), the remaining objects to be processed are for an element (an object with a UID) that is not found in {A} (it is only in {B}) and was not created by an Explicit transaction in {B}, and is therefore the result of an Implicit transaction on an object in list {B}:

UID Change Conflicts

If both the objects involved in the conflict are folders with the same name but a different UID, then the system considers this as an UID change conflict and deals with it accordingly. If both the objects are files, then objects created by the Explicit Transaction override while presenting the listing view of the folder to end-clients (this accomplishes the goal of using the most current version of the object data); and Type Mismatch Conflicts If the cloud storage already has an object with the same name as the object which is being pushed by an Explicit Transaction, and their types do not match, then this is a Type mismatch conflict.

These conflicts may be resolved using the architecture and logic described as follows:

Resolving Type Mismatch

Type mismatch conflicts may be detected by both the Cloud Push and Metadata Reconciliation processes. If they are detected by the Metadata Reconciliation process first, then they are resolved by choosing to make the Explicit Transaction's object (MIMO) override (or mask) the cloud object. This is only temporary, until the Explicit Transaction undergoes the Cloud Push process.

In some embodiments, conflicts detected by the Cloud Push process are resolved by adding a randomly generated suffix to an object's name and re-attempting the push of the Explicit Transaction. For example, this conflict situation might arise when an end user of the hybrid cloud cache created a file "foo" under a folder F, by an explicit TxID-X. At the same time, a folder "foo" was created in the cloud storage (i.e., by an Implicit transaction). When this Explicit transaction, X, becomes ready for the Cloud Push process, the push will fail in the initial attempt, as the system cannot have a file and folder with both named "foo" as siblings. The Cloud Push process then retries the push, by adding a suffix to the name "foo", and this is expected to succeed, because the generated suffix is random enough to prevent any further name clashes.

Resolving UID Change

UID change conflicts may be detected by both the Cloud Push and Metadata Reconciliation processes. If they are detected by the Metadata Reconciliation process, then they are temporarily resolved by moving the object to the Orphanage (corresponding to the "No" branch of step or stage 318 and the "Yes" branch of step or stage 322, and as indicated by the "Move to Orphanage" operation 312 from UID Change Conflict state 324). For example, assume {B} has an element <X, UID2>, and {A} has an element <X, UID1>, where "X" is name of the element. By definition, this is a UID change conflict. Every Explicit Transaction involves a direct object on which it is causing changes, and an indirect object, which is the parent folder of that direct object[2]. The following are examples of Explicit Transactions that can create this type of conflict. Recall that "a conflict" requires two parties-one Explicit and one Implicit transaction. For this reason, it is sometimes said that there are two types of conflicts which Explicit and Implicit Transactions can "run into". Further, a conflict can be "detected" by either the (a) Metadata Reconciliation or (b) Cloud Push processes.

[2] A rename Explicit Transaction involves two indirect objects-source and destination parents, but UID change can happen only for the destination parent.

1. Indirect UID Change

This is a situation where an Explicit Transaction detects a UID change of an indirect object (such as a parent folder of a direct object) involved in it. The following are examples of possible Indirect UID changes:

An upload-file/create-folder transaction can see that its parent folder UID got changed in the cloud;

A rename-file/rename-folder transaction can see that its destination parent folder UID got changed in the cloud;

Returning to FIG. 3A, if the element name exists in {A} with the same name as in {B} (corresponding to the "Yes" branch of step or stage 322), but a different UID, then the system treats this as a UID change conflict (as suggested by element 324). This situation is resolved temporarily by moving the element to the Orphanage (as suggested by operation 312). Next, the logic checks to determine whether the element is already cached locally elsewhere in the namespace (as suggested by step or stage 326). If the outcome is no, then no further action is needed (as indicated by the "No" branch of 326 and the "No further action needed" state 310). If the outcome is yes, then the element is moved to the Orphanage (as indicated by the "Yes" branch of 326 and the "Move to Orphanage" operation 312).

In some embodiments, an Indirect UID change is conceptually treated as a delete, followed by re-creation of a new folder with the same name—this is termed "reincarnating" a folder object with a different UID. This may be handled in the following sequence of steps. FIG. 3B is a diagram illustrating further details of the "reincarnation" process, method, function, or operation for implementing a consistent and persistent hybrid cloud cache, in accordance with some embodiments of the systems, apparatuses, and methods described herein.

Assume a folder F, is undergoing an Indirect UID change, from old UID (OUID) to a new UID (NUID)—in this scenario (and as illustrated in FIG. 3B), an embodiment may perform the following steps, processes, or operations:

i. Lock all the resources corresponding to in-core representation of folder F (as suggested by step or stage 340);

ii. Ignore all MIMOs added to folder F by Explicit Transactions which are already pushed to the cloud (as suggested by step or stage 342);

iii. Create a folder F' in purgatory (a hidden namespace of deleted folders) of hybrid cloud-cache with OUID (as suggested by step or stage 344). Move the current metadata of folder F to F' (as suggested by step or stage 346) (as used herein, "Purgatory" refers to a repository of objects that are deleted via Explicit Transactions, while Orphanage refers to a temporary repository of objects. In some embodiments, an Object may be moved to the Orphanage for variety of reasons, such as, conflicts[3]);

[3] A further description of the treatment of objects in the Orphanage is described in U.S. Provisional Patent Application Ser. No. 63/040, 255, entitled "System And Method For Handling Implicit Transactions In A Hybrid Cloud Cache", filed Jun. 17, 2020, assigned to the assigned of the present application, and the entire contents of which is hereby incorporated by reference.

iv. Change the UID of F from OUID to NUID, this will transfer all of the un-pushed Explicit Transactions of OUID to NUID, as well as keep the relationship with its descendants intact (as suggested by step or stage 348);

v. Schedule F for the Metadata Reconciliation process, so that cache will fetch the most-recent metadata from the cloud before presenting it to the end-user (as suggested by step or stage 350); and vi. Release all the resources (locks, memory etc., as suggested by step or stage 352).

At the end of the indirect UID change process, end-users will see F with NUID in the namespace—this will show the changes due to both Implicit transactions and un-pushed Explicit Transactions.

2. Direct UID Change

Direct UID change is detected and resolved by the Cloud Push process only. This is a transition of a local folder[4] to a cloud folder[5]. When this change is detected, the MIMOs on the local folder are updated to reflect the cloud UID, so that they get pushed to the cloud correctly.

[4] local folder—created by an Explicit Transaction and exists only in the local cache with a cache-generated UID. Thus, at this point, the cloud storage has no knowledge of this folder.

[5] cloud folder—exists in cloud storage, and may or may not be cached locally, and has cloud-generated UID. A local folder when pushed to the cloud, transitions into a cloud folder.

In some sense, the Metadata Reconciliation process' role is to detect conflicts but provide a temporary resolution to maintain a consistent view of the cached namespace, until the Explicit Transaction which generated the conflict goes through the Cloud Push, which provides a final resolution.

The following table summarizes how Metadata Reconciliation and Cloud Push complement each other in providing the consistency, in case of conflicts:

| | UID change | Type mismatch |
|---|---|---|
| Metadata Reconciliation | Moves the object to orphanage, a hidden namespace | MIMO overrides the cloud object in presenting consistent view |
| Cloud Push | Reincarnates the object | Add random suffix to object's name and retry the push |

As described herein, in the operation of a hybrid cloud cache, Explicit and Implicit transactions may run into conflicts with each other. A conflict can be detected by both the Metadata Reconciliation and the Cloud Push processes, with a goal of both processes being to maintain integrity of the cached namespace while presenting a consistent view of it to end-users of the hybrid cloud cache. If a Type Mismatch conflict is detected by the Metadata Reconciliation process, it operates to mask the conflict by choosing to override an Implicit Transaction's changes with those of the corresponding Explicit Transaction's. In the case of a UID change conflict, the concerned object is moved to the Orphanage, a hidden namespace. In some sense, conflict resolutions provided by the Metadata Reconciliation Process are temporary in nature, while the Cloud Push process provides a final resolution to the conflicts. A conflict detected by the Metadata Reconciliation process will eventually be detected by the Cloud Push process when the concerned Explicit Transaction pushes its changes to the cloud. The Cloud Push process provides resolution to the conflicts by reincarnating the involved object in case of a UID change conflict and by adding a suffix to the name and retrying the push in the case of a Type Mismatch conflict.

Figure 4:
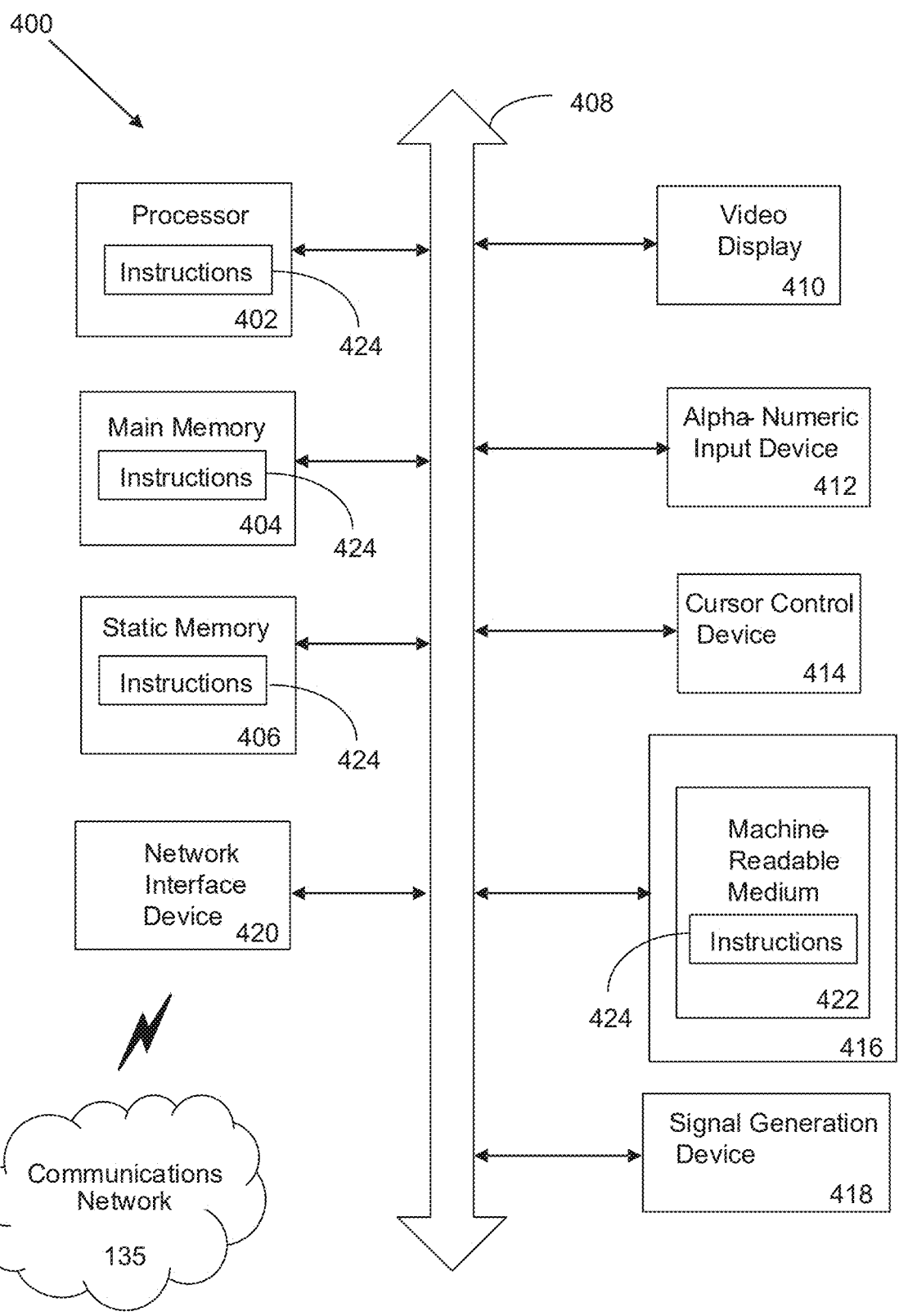
FIG. 4 is a diagram illustrating elements or components that may be present in a computer device or system configured to implement a method, process, function, or operation in accordance with some embodiments of the systems, apparatuses, and methods described herein.

FIG. 4 is a diagram illustrating elements or components that may be present in a computer device or system configured to implement a method, process, function, or operation in accordance with some embodiments of the systems, apparatuses, and methods described herein. As noted, in some embodiments, the system and methods may be implemented in the form of an apparatus that includes a processing element and a set of executable instructions. The executable instructions may be part of a software application and arranged into a software architecture. In general, an embodiment may be implemented using a set of software instructions that are designed to be executed by a suitably programmed processing element (such as a GPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the described system and methods, such as those described with reference to FIGS. 1, 2, 3A, and 3B.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

The modules may contain one or more sets of instructions for performing a method or function described with reference to the Figures, and the descriptions of the functions and operations provided in the specification. These modules may include those illustrated but may also include a greater number or fewer number than those illustrated. As mentioned, each module may contain a set of computer-executable instructions. The set of instructions may be executed by a programmed processor contained in a server, client device, network element, system, platform or other component. A module may contain instructions that are executed by a processor contained in more than one of a server, client device, network element, system, platform or other component. Thus, in some embodiments, a plurality of electronic processors, with each being part of a separate device, server, or system may be responsible for executing all or a portion of the software instructions contained in an illustrated module. Thus, although FIG. 4 illustrates a set of modules which taken together perform multiple functions or operations, these functions or operations may be performed by different devices or system elements, with certain of the modules (or instructions contained in those modules) being associated with those devices or system elements.

Referring to FIG. 4, at least a portion of the methodologies and techniques described with respect to the exemplary embodiments of the system 100 can incorporate a machine, such as, but not limited to, computer system 400, or other computing device within which a set of instructions, when executed, may cause the machine to perform any one or more of the methodologies or functions discussed herein. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 145, the server 150, the database 155, the server 160, the external network 165, the REST API 202, the smart cache API layer 204, the journaling system 206, the metadata cache manager 208, the data cache manager 210, the metadata store 212, the data store 214, the policy enforcer 216, the cache refresh manager 218, the cloud file storage system 220, the recovery manager 222, the policy engine 224, any of the components of FIGS. 1, 2, 3A, and 3B, other system, program, and/or device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410, which may be, but is not limited to, a liquid crystal display (LCD), a flat panel, a solid-state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of computer-executable instructions 424, such as, but not limited to, software embodying any one or more of the methodologies or functions described herein, including those methods described with reference to the Figures and specification. The instructions 424 may also reside, completely or at least partially, within the main memory 404, the static memory 406, or within the processor 402, or a combination thereof, during execution thereof by the computer system 400. The main memory 404 and the processor 402 may also constitute machine-readable media.

Dedicated hardware implementations including, but not limited to, application specific integrated circuits, programmable logic arrays and other hardware devices can likewise be constructed to implement the methods described herein. Applications that may include the apparatus, methods, and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 422 containing instructions 424 so that a device connected to the communications network 135, another network, or a combination thereof, can send or receive voice, video or data, and communicate over the communications network 135, another network, or a combination thereof, using the instructions. The instructions 424 may further be transmitted or received over the communications network 135, another network, or a combination thereof, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

This disclosure includes the following clauses related to one or more embodiments:

Clause 1. A method for managing a hybrid cloud cache, comprising:

obtaining a first list of objects in a folder, wherein the first list is generated from a copy of the folder stored locally;

obtaining a second list of objects in the folder, wherein the second list is generated from a copy of the folder stored in a cloud storage element;

comparing the second list of objects in the folder to the first list of objects in the folder;

based on the comparison, identifying a conflict between information in the first list and information in the second list;

determining if the identified conflict is an identifier change conflict; and if the identified conflict is an identifier change conflict, then moving the objects involved in the conflict into a hidden namespace.

Clause 2. The method of clause 1, further comprising:

obtaining a data object representing operations performed on the folder as a result of execution of explicit transactions occurring locally;

executing any explicit transactions in the cloud storage that have been executed locally but not in the cloud storage; and based on the outcome of executing the explicit transactions that have been executed locally but not in the cloud storage, determining if the identifier change conflict is a direct identifier change conflict or an indirect identifier change conflict, wherein if the identifier change conflict is a direct change conflict, then changing an object's identifier in the data object to an identifier returned by execution of an explicit transaction in the cloud storage, and if the identifier change conflict is an indirect change conflict, then deleting the object and recreating the object with a different identifier.

Clause 3. The method of clause 2, further comprising:

determining if the identified conflict is a type mismatch conflict; and if the identified conflict is a type mismatch conflict, then adding a randomly generated suffix to the object's name.

Clause 4. The method of clause 3, further comprising using the data object representing operations performed on the folder as a result of executing explicit transactions occurring locally to override both an identifier change conflict and a type mismatch conflict, and thereby to present a consistent view of a namespace.

Clause 5. The method of clause 1, wherein the first list and the second list comprise metadata for each of a plurality of objects in the folder.

Clause 6. The method of clause 5, where the metadata comprises one or more of an identifier, name, timestamp, size, or checksum.

Clause 7. The method of clause 1, wherein if an object has the same name in the first list and in the second list, but has a different type in the lists, then the identified conflict is a type mismatch conflict.

Clause 8. The method of clause 1, wherein if an object has the same name in the first list and in the second list, but has a different identifier in the lists, then the identified conflict is an identifier change conflict.

Clause 9. The method of clause 2, wherein if execution of an explicit transaction in the cloud storage returns a type mismatch, then the identified conflict is a type mismatch conflict.

Clause 10. The method of clause 2, wherein if execution of an explicit transaction in the cloud storage returns an identifier for the object that is different than the identifier recorded in the explicit transaction, then the identified conflict is an identifier change conflict.

Clause 11. The method of clause 1, wherein identifying a conflict between information in the first list and information in the second list further comprises executing a metadata reconciliation process or a cloud push process, wherein the metadata reconciliation process operates to provide a temporary resolution of a conflict and the cloud push process operates to provide a final resolution of the conflict.

Clause 12. The method of clause 2, wherein identifying a conflict between information in the first list and information in the second list further comprises executing a metadata reconciliation process or a cloud push process, wherein the metadata reconciliation process operates to provide a temporary resolution of a conflict and the cloud push process operates to provide a final resolution of the conflict.

Clause 13. The method of clause 2, wherein deleting the object and recreating the object with a different identifier further comprises:

locking resources corresponding to an in-core representation of the folder;

ignoring objects added to the data object for the folder by transactions performed locally that have been pushed to the cloud;

creating a corresponding folder in a namespace of deleted folders locally with the initial identifier of the folder;

moving the metadata of the folder to the corresponding folder;

changing the identifier of the folder to a new identifier;

scheduling the folder for a metadata reconciliation process; and releasing the locks placed on the resources.

Clause 14. The method of clause 1, wherein the second list is obtained by refreshing a node in a namespace of an object stored locally, and wherein refreshing the node causes a fetch of the second list from the cloud storage element.

Clause 15. A system for managing a hybrid cloud cache, comprising:

one or more electronic processors configured to execute a set of computer-executable instructions; and the set of computer-executable instructions, wherein when executed, the instructions cause the one or more electronic processors to obtain a first list of objects in a folder, wherein the first list is generated from a copy of the folder stored locally;

obtain a second list of objects in the folder, wherein the second list is generated from a copy of the folder stored in a cloud storage element;

compare the second list of objects in the folder to the first list of objects in the folder;

based on the comparison, identify a conflict between information in the first list and information in the second list;

determine if the identified conflict is an identifier change conflict; and if the identified conflict is an identifier change conflict, then move the objects involved in the conflict into a hidden namespace.

Clause 16. The system of clause 15, wherein the instructions further cause the one or more electronic processors to:

obtain a data object representing operations performed on the folder as a result of execution of explicit transactions occurring locally;

execute any explicit transactions in the cloud storage that have been executed locally but not in the cloud storage; and based on the outcome of executing the explicit transactions that have been executed locally but not in the cloud storage, determine if the identifier change conflict is a direct identifier change conflict or an indirect identifier change conflict, wherein if the identifier change conflict is a direct change conflict, then changing an object's identifier in the data object to an identifier returned by execution of an explicit transaction in the cloud storage, and if the identifier change conflict is an indirect change conflict, then deleting the object and recreating the object with a different identifier.

Clause 17. The system of clause 16, wherein the instructions further cause the one or more electronic processors to:

determine if the identified conflict is a type mismatch conflict;

if the identified conflict is a type mismatch conflict, then add a randomly generated suffix to the object's name; and use the data object representing operations performed on the folder as a result of executing explicit transactions occurring locally to override both an identifier change conflict and a type mismatch conflict, and thereby to present a consistent view of a namespace.

Clause 18. A set of computer-executable instructions that when executed by one or more programmed electronic processors, cause the processors to manage a hybrid cloud cache by:

obtaining a first list of objects in a folder, wherein the first list is generated from a copy of the folder stored locally;

obtaining a second list of objects in the folder, wherein the second list is generated from a copy of the folder stored in a cloud storage element;

comparing the second list of objects in the folder to the first list of objects in the folder;

based on the comparison, identifying a conflict between information in the first list and information in the second list;

determining if the identified conflict is an identifier change conflict; and if the identified conflict is an identifier change conflict, then moving the objects involved in the conflict into a hidden namespace.

Clause 19. The set of computer-executable instructions of clause 18, further comprising instructions that cause the processors to:

obtain a data object representing operations performed on the folder as a result of execution of explicit transactions occurring locally;

execute any explicit transactions in the cloud storage that have been executed locally but not in the cloud storage; and based on the outcome of executing the explicit transactions that have been executed locally but not in the cloud storage, determine if the identifier change conflict is a direct identifier change conflict or an indirect identifier change conflict, wherein if the identifier change conflict is a direct change conflict, then changing an object's identifier in the data object to an identifier returned by execution of an explicit transaction in the cloud storage, and if the identifier change conflict is an indirect change conflict, then deleting the object and recreating the object with a different identifier.

Clause 20. The set of computer-executable instructions of clause 19, further comprising instructions that cause the processors to:

determine if the identified conflict is a type mismatch conflict;

if the identified conflict is a type mismatch conflict, then add a randomly generated suffix to the object's name; and use the data object representing operations performed on the folder as a result of executing explicit transactions occurring locally to override both an identifier change conflict and a type mismatch conflict, and thereby to present a consistent view of a namespace.

Clause 21. The method of clause 4, wherein the steps or stages of clause 1, clause 2, and clause 3 are performed concurrently.

Clause 22. The method of clause 1, further comprising:

determining if the identified conflict is a type mismatch conflict; and if the identified conflict is a type mismatch conflict, then adding a randomly generated suffix to the object's name.

Clause 23. The system of clause 17, wherein the steps or stages of clause 15 and clause 16 are performed concurrently.

Clause 24. The system of clause 16, wherein the instructions further cause the one or more electronic processors to delete the object and recreate the object with a different identifier by:

locking resources corresponding to an in-core representation of the folder;

ignoring objects added to the data object for the folder by transactions performed locally that have been pushed to the cloud;

creating a corresponding folder in a namespace of deleted folders locally with the initial identifier of the folder;

moving the metadata of the folder to the corresponding folder;

changing the identifier of the folder to a new identifier;

scheduling the folder for a metadata reconciliation process; and releasing the locks placed on the resources.

Clause 25. The set of computer-executable instructions of clause 20, wherein the steps or stages of clause 18 and clause 19 are performed concurrently.

Clause 26. The set of computer-executable instructions of clause 19, wherein the instructions further cause the one or more electronic processors to delete the object and recreate the object with a different identifier by:

locking resources corresponding to an in-core represen-
    tation of the folder;
  ignoring objects added to the data object for the folder by
    transactions performed locally that have been pushed to
    the cloud;
  creating a corresponding folder in a namespace of deleted
    folders locally with the initial identifier of the folder;
  moving the metadata of the folder to the corresponding
    folder;
  changing the identifier of the folder to a new identifier;
  scheduling the folder for a metadata reconciliation pro-
    cess; and
  releasing the locks placed on the resources.

Any of the software components, processes or functions described in this application may be implemented as software code to be executed by a processor using any suitable computer language such as Python, Java, JavaScript, C++ or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory wave-form. Any such computer readable medium may reside on or within a single computational apparatus and may be present on or within different computational apparatuses within a system or network. However, as mentioned, in some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DV D) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that may direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein may be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the invention unless otherwise claimed. No language in the specification should be construed as indicating any non-claimed element as essential to each embodiment.

As used herein (that is, in the specification, figures and claims), the term "or" is used inclusively to refer items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for managing a hybrid cloud cache, comprising:

obtaining a first list of objects in a folder, wherein the first list is generated from a copy of the folder stored locally;

obtaining a second list of objects in the folder, wherein the second list is generated from a copy of the folder stored in a cloud storage element;

obtaining a data object representing operations performed on the folder as a result of execution of explicit transactions occurring locally;

comparing the second list of objects in the folder to the first list of objects in the folder; based on the comparison, identifying a conflict between information in the first list and information in the second list;

determining if the identified conflict is an identifier change conflict;

if the identified conflict is an identifier change conflict, then moving the objects involved in the conflict into a hidden namespace of the hybrid cloud cache;

executing any explicit transactions in the cloud storage that have been executed locally but not in the cloud storage; and based on the outcome of executing the explicit transactions that have been executed locally but not in the cloud storage, determining if the identifier change conflict is a direct identifier change conflict or an indirect identifier change conflict, wherein if the identifier change conflict is a direct change conflict, then changing an object's identifier in the data object to an identifier returned by execution of an explicit transaction in the cloud storage, and if the identifier change conflict is an indirect change conflict, then deleting the object and recreating the object with a different identifier.

2. The method of claim 1, further comprising:

determining if the identified conflict is a type mismatch conflict; and if the identified conflict is a type mismatch conflict, then adding a randomly generated suffix to the object's name.

3. The method of claim 2, further comprising using the data object representing operations performed on the folder as a result of executing explicit transactions occurring locally to override both an identifier change conflict and a type mismatch conflict, and thereby to present a consistent view of a namespace.

4. The method of claim 1, wherein the first list and the second list comprise metadata for each of a plurality of objects in the folder.

5. The method of claim 4, where the metadata comprises one or more of an identifier, name, timestamp, size, or checksum.

6. The method of claim 1, wherein if an object has the same name in the first list and in the second list, but has a different type in the lists, then the identified conflict is a type mismatch conflict.

7. The method of claim 1, wherein if an object has the same name in the first list and in the second list, but has a different identifier in the lists, then the identified conflict is an identifier change conflict.

8. The method of claim 1, wherein if execution of an explicit transaction in the cloud storage returns a type mismatch, then the identified conflict is a type mismatch conflict.

9. The method of claim 1, wherein if execution of an explicit transaction in the cloud storage returns an identifier for the object that is different than the identifier recorded in the explicit transaction, then the identified conflict is an identifier change conflict.

10. The method of claim 1, wherein identifying a conflict between information in the first list and information in the second list further comprises executing a metadata reconciliation process or a cloud push process, wherein the metadata reconciliation process operates to provide a temporary resolution of a conflict and the cloud push process operates to provide a final resolution of the conflict.

11. The method of claim 1, wherein identifying a conflict between information in the first list and information in the second list further comprises executing a metadata reconciliation process or a cloud push process, wherein the metadata reconciliation process operates to provide a temporary resolution of a conflict and the cloud push process operates to provide a final resolution of the conflict.

12. The method of claim 1, wherein deleting the object and recreating the object with a different identifier further comprises: locking resources corresponding to an in-core representation of the folder; ignoring objects added to the data object for the folder by transactions performed locally that have been pushed to the cloud; creating a corresponding folder in a namespace of deleted folders locally with the initial identifier of the folder; moving the metadata of the folder to the corresponding folder; changing the identifier of the folder to a new identifier; scheduling the folder for a metadata reconciliation process; and releasing the locks placed on the resources.

13. The method of claim 1, wherein the second list is obtained by refreshing a node in a namespace of an object stored locally, and wherein refreshing the node causes a fetch of the second list from the cloud storage element.

14. A system for managing a hybrid cloud cache, comprising:

one or more electronic processors configured to execute a set of computer executable instructions; and the set of computer-executable instructions, wherein when executed, the instructions cause the one or more electronic processors to obtain a first list of objects in a folder, wherein the first list is generated from a copy of the folder stored locally;

obtain a second list of objects in the folder, wherein the second list is generated from a copy of the folder stored in a cloud storage element;

obtain a data object representing operations performed on the folder as a result of execution of explicit transactions occurring locally;

compare the second list of objects in the folder to the first list of objects in the folder;

based on the comparison, identify a conflict between information in the first list and information in the second list;

determine if the identified conflict is an identifier change conflict;

if the identified conflict is an identifier change conflict, then move the objects involved in the conflict into a hidden namespace of the hybrid cloud cache;

execute any explicit transactions in the cloud storage that have been executed locally but not in the cloud storage; and based on the outcome of executing the explicit transactions that have been executed locally but not in the cloud storage, determine if the identifier change conflict is a direct identifier change conflict or an indirect identifier change conflict, wherein if the identifier change conflict is a direct change conflict, then changing an object's identifier in the data object to an identifier returned by execution of an explicit transaction in the cloud storage, and if the identifier change conflict is an indirect change conflict, then deleting the object and recreating the object with a different identifier.

15. The system of claim 14, wherein the instructions further cause the one or more electronic processors to:

determine if the identified conflict is a type mismatch conflict;

if the identified conflict is a type mismatch conflict, then add a randomly generated suffix to the object's name; and use the data object representing operations performed on the folder as a result of executing explicit transactions occurring locally to override both an identifier change conflict and a type mismatch conflict, and thereby to present a consistent view of a namespace.

16. A set of computer-executable instructions that when executed by one or more programmed electronic processors, cause the processors to manage a hybrid cloud cache by:

obtaining a first list of objects in a folder, wherein the first list is generated from a copy of the folder stored locally;

obtaining a second list of objects in the folder, wherein the second list is generated from a copy of the folder stored in a cloud storage element;

obtaining a data object representing operations performed on the folder as a result of execution of explicit transactions occurring locally;

comparing the second list of objects in the folder to the first list of objects in the folder;

based on the comparison, identifying a conflict between information in the first list and information in the second list;

determining if the identified conflict is an identifier change conflict; and if the identified conflict is an identifier change conflict, then moving the objects involved in the conflict into a hidden namespace of the hybrid cloud cache;

execute any explicit transactions in the cloud storage that have been executed locally but not in the cloud storage; and based on the outcome of executing the explicit transactions that have been executed locally but not in the cloud storage, determine if the identifier change conflict is a direct identifier change conflict or an indirect identifier change conflict, wherein if the identifier change conflict is a direct change conflict, then changing an object's identifier in the data object to an identifier returned by execution of an explicit transaction in the cloud storage, and if the identifier change conflict is an indirect change conflict, then deleting the object and recreating the object with a different identifier.

17. The one or more non-transitory computer-readable media of claim 16, further comprising instructions that cause the processors to:

determine if the identified conflict is a type mismatch conflict;

if the identified conflict is a type mismatch conflict, then add a randomly generated suffix to the object's name; and use the data object representing operations performed on the folder as a result of executing explicit transactions occurring locally to override both an identifier change conflict and a type mismatch conflict, and thereby to present a consistent view of a namespace.

* * * * *